United States Patent [19]
Fujikake et al.

[11] Patent Number: 6,084,032
[45] Date of Patent: Jul. 4, 2000

[54] CARBOXYLATED POLYMER COMPOSITION

[75] Inventors: Masato Fujikake; Shinji Kobayashi; Shigeki Hamamoto; Mitsutaka Tabata; Tomoki Kawakita, all of Himeji, Japan

[73] Assignee: Sumitomo Seika Chemicals Co., Ltd., Hyogo, Japan

[21] Appl. No.: 08/983,442

[22] PCT Filed: Jul. 11, 1996

[86] PCT No.: PCT/JP96/01930

§ 371 Date: Apr. 22, 1998

§ 102(e) Date: Apr. 22, 1998

[87] PCT Pub. No.: WO97/03128

PCT Pub. Date: Jan. 30, 1997

[30] Foreign Application Priority Data

Jul. 12, 1995 [JP] Japan ................................. 7-200575

[51] Int. Cl.$^7$ ............................. C08L 39/04; C08F 8/30; C08F 36/00; C08F 30/04

[52] U.S. Cl. ................... 525/203; 525/183; 525/329.3; 526/240

[58] Field of Search ..................... 525/203, 183, 525/329.3; 526/240

[56] References Cited

U.S. PATENT DOCUMENTS

| | | | |
|---|---|---|---|
| 4,003,870 | 1/1977 | Gibson et al. | 260/29.6 RW |
| 4,286,082 | 8/1981 | Tsubakimoto et al. | 526/240 |
| 4,904,722 | 2/1990 | Lundeberg et al. | 524/385 |
| 5,403,883 | 4/1995 | Messner et al. | 524/458 |
| 5,519,063 | 5/1996 | Mondet et al. | 514/772.4 |
| 5,804,611 | 9/1998 | Takoh et al. | 523/122 |
| 5,868,136 | 2/1999 | Fox et al. | 128/640 |

FOREIGN PATENT DOCUMENTS

| | | | |
|---|---|---|---|
| 0 435 066 A2 | 7/1991 | European Pat. Off. | C08F 2/06 |
| 53-183754 | 9/1893 | Japan . | |
| 56-118445 | 9/1981 | Japan | C08L 33/02 |
| 58-084819 | 5/1983 | Japan | C08G 59/18 |
| 58-183754 | 10/1983 | Japan | C08L 101/00 |
| 182362 | 7/1989 | Japan . | |

OTHER PUBLICATIONS

Billmeyer, F., Jr. Textbook of Polymer Science. 3–d edition, John Willey & Sons, pp. 138–139, 1984.

*Primary Examiner*—David W. Wu
*Assistant Examiner*—Tanya Zalukaeva
*Attorney, Agent, or Firm*—Pollock, Vande Sande & Amernick

[57] ABSTRACT

A polymer composition containing carboxyl groups which has excellent water solubility, thickening properties and flow characteristics. The composition comprises (A) a crosslinked polymer comprising (a) an α,β-unsaturated carboxylic acid and (b) a compound having at least two ethylenically unsaturated groups, and (B) at least one polymer comprising N-vinylpyrrolidone as essential monomer.

5 Claims, No Drawings

CARBOXYLATED POLYMER COMPOSITION

TECHNICAL FIELD

The present invention relates to a polymer composition containing carboxyl group having good solubility, thickening property and flow characteristics and suited for use as a thickener for various aqueous solutions.

BACKGROUND ART

Crosslinked polymer containing carboxyl group have so far been used as thickeners for various aqueous solutions. Such crosslinked polymers containing carboxyl group include, among others, copolymers of an α,β-unsaturated carboxylic acid, such as acrylic acid, and a polyallyl ether (U.S. Pat. No. 2,923,692), copolymers of an α,β-unsaturated carboxylic acid and hexaallyltrimethylene trisulfone (U.S. Pat. No. 2,958,679), copolymers of an α,β-unsaturated carboxylic acid and triallyl phosphate (U.S. Pat. No. 3,426,004) and copolymers of an α,β-unsaturated carboxylic acid and glycidyl methacrylate or the like (Japanese Kokai Publication Sho-58-84819).

These crosslinked polymers containing carboxyl group are once dissolved in water and then neutralized with an alkali, and the neutralized viscous liquids are used as thickeners, as suspension stabilizers for emulsions or suspensions, and for other purposes. Therefore, it is necessary to first prepare uniform aqueous solutions. It is thus of primary importance to prevent a formation of undissolved powder lumps on the occasion of dissolution in water. Once an undissolved powder lump is formed, a gel-like layer is formed on the lump surface and this decreases the rate of diffusion of water into the lump inside and makes it difficult to obtain a uniform aqueous solution.

Moreover, the higher the viscosity of the neutralized viscous liquid is, the wider the field of application as a thickener becomes and the lesser the amount required is. Further, for the flowing characteristics such as yield value, the higher the yield value is, the wider the field of application as a suspension stabilizer for emulsions and suspensions, hence the commercial value becomes higher.

SUMMARY OF THE INVENTION

In view of the foregoing, it is an object of the present invention to provide a polymer composition containing carboxyl group which is excellent in water solubility, in thickening effect and in flow characteristics of the neutralized viscous liquid obtained after neutralization of the aqueous solution.

The gist of the present invention lies in that the polymer composition containing carboxyl group comprises (A) a crosslinked polymer prepared from (a) an α,β-unsaturated carboxylic acid and (b) a compound having at least two ethylenically unsaturated groups, and (B) at least one of a polymer comprising vinylpyrrolidone as an essential constituent thereof, and polyethylene oxide.

DETAILED DESCRIPTION OF THE INVENTION

In the following, the present invention is described in further detail.

The α,β-unsaturated carboxylic acid (a) to be used in the practice of the present invention is not limited to any particular species but includes, among others, acrylic acid, methacrylic acid, crotonic acid, maleic acid, itaconic acid, fumaric acid and other olefinic unsaturated carboxylic acids. These may be used either singly or in combination as a mixture of two or more. Among them, acrylic acid is most preferred since it is readily available at low cost and can give polymers having good performance.

The compound (b) having at least two ethylenically unsaturated groups, which is to be used in the practice of the present invention, is not limited to any particular species provided that it is soluble in the inert solvent to be described later herein. Thus, it includes, among others, acrylate esters with two or more acryloyl moieties as derived from polyols such as ethylene glycol, propylene glycol, polyoxyethylene glycol, polyoxypropylene glycol, glycerol, polyglycerol, trimethylolpropane, pentaerythritol, saccharose, sorbitol, etc.; methacrylate esters with two or more methacryloyl moieties as derived from such polyols, allyl ethers with two or more allyl moieties as derived from such polyols; diallyl phthalate, triallyl phosphate, allyl methacrylate, tetraallyloxyethane, triallyl cyanurate, divinyl adipate, vinyl crotonate, 1,5-hexadiene, divinylbenzene, and the like. Among these, pentaerythritol tetraallyl ether, tetraallyloxyethan, triallyl phosphate and polyallylsaccharose are preferred since they can give polymers with good performance.

The above-mentioned compound (b) having at least two ethylenically unsaturated groups is used preferably at an addition level of 0.05 to 10% by weight based on the crosslinked polymer (A). At addition levels below 0.05% by weight, the addition produces no or little effect while at addition levels exceeding 10% by weight, the polymer reaches an advanced three-dimensional state, resulting in formation of insoluble gels. A more preferred addition level lies within the range of 0.1 to 3%. by weight. An optimal addition level may vary depending on various factors, however.

The polymer comprising vinylpyrrolidone as an essential constituent thereof, which is to be used in the practice of the present invention, is not limited to any particular species but includes polyvinylpyrrolidone, vinylpyrrolidone-vinyl acetate copolymer, vinylpyrrolidone-stearyl (meth)acrylate copolymer, vinylpyrrolidone-dimethylaminoethyl (meth) acrylate copolymer, diethyl sulfate salt of vinylpyrrolidone-dimethylaminoethyl methacrylate copolymer, vinylpyrrolidone-hexadecene copolymer, vinylpyrrolidone-eicosene copolymer, vinylpyrroiidone-styrene copolymer, vinylpyrrolidone-vinyl alcohol copolymer, vinylpyrrolidone-vinylcaprolactam-dimethylaminoethyl (meth)acrylate terpolymer, vinylpyrrolidone-methacrylamidopropyltrimethylammo nium chloride copolymer, and the like. Among them, polyvinylpyrrolidone, vinylpyrrolidone-vinyl acetate copolymer, vinylpyrrolidone-hexadecene copolymer and vinylpyrrolidone-eicosene copolymer are preferred since these can give polymer compositions having good performance characteristics.

The content of (B), namely at least one member selected from among polymers comprising vinylpyrrolidone as an essential constituent thereof and polyethylene oxide, may vary depending on the species and molecular weight thereof and other conditions but, generally, it is 0.01 to 0 parts by weight per 100 parts by weight of crosslinked polymer (A). When the content is below 0.01 part, no or little effect can result from the addition. When it exceeds 0 parts by weight, the thickening effect of the resulting polymer composition containing carboxyl group decreases. A more preferred content range is 0.1 to 10 parts by weight.

The polymer composition containing carboxyl group of the present invention can be produced, for example, in the following manner.

A reaction vessel equipped with a stirrer, thermometer, nitrogen inlet tube and condenser is charged with an α,β-unsaturated carboxylic acid (a), a compound (b) having at least two ethylenically unsaturated groups, radical polymerization catalyst, inert solvent, and the component (B), namely at least one of a polymer comprising vinylpyrrolidone as an essential constituent thereof and polyethylene oxide.

On that occasion, the total amount to be charged of the α,β-unsaturated carboxylic acid (a) and the compound (b) having at least two ethylenically unsaturated groups is preferably 1 to 30% by weight relative to the total charge. When said amount exceeds 30% by weight, polymer deposition becomes significant and the reaction mixture becomes difficult to uniformly agitate with the progress of the polymerization reaction. A more preferred range is 5 to 25% by weight.

After attaining uniform mixing with stirring, gaseous nitrogen is blown into the solution to thereby purge off oxygen in the upper space of the reaction vessel and oxygen dissolved in the starting materials and solvent. The polymerization reaction is initiated by heating to 20° C. to 120° C., preferably to 30° C. to 90° C., on a water bath or the like. Generally, the polymerization reaction will be complete in 2 to 10 hours.

After completion of the polymerization reaction, the inert solvent is removed by heating reaction mass to 50° C. to 160° C., whereby a polymer composition containing carboxyl group is obtained as a white fine powder.

The polymer composition containing carboxyl group of the present invention can also be produced by charging the α,β-unsaturated carboxylic acid (a) and the compound (b) having at least two ethylenically unsaturated groups and conducting polymerization while continuously adding the component (B), i.e. at least one of a polymer comprising vinylpyrrolidone as an essential constituent thereof and polyethylene oxide.

The polymer composition containing carboxyl group of the invention can further be produced by polymerizing in advance the α,β-unsaturated carboxylic acid (a) and the compound (b) having at least two ethylenically unsaturated groups and adding at least one (B) of a polymer comprising vinylpyrrolidone as an essential constituent thereof and polyethylene oxide, in powder form, to the slurry obtained after completion of the polymerization step.

Furthermore, the polymer composition containing carboxyl group of the invention can be produced by polymerizing in advance the α,β-unsaturated carboxylic acid (a) and the compound (b) having at least two ethylenically unsaturated groups, drying the thus-obtained crosslinked polymer (A) and dry-blending the resulting powder with at least one (B) of a polymer comprising vinylpyrrolidone as an essential constituent thereof and polyethylene oxide, in powder form.

The inert solvent mentioned hereinabove is not limited to any particular species provided that the starting monomers are soluble therein but the final polymer composition containing carboxyl group is insoluble therein. Thus, it includes, for example, normal pentane, normalhexane, isohexane, normalheptane, normaloctane, isooctane, cyclopentane, methylcyclopentane, cyclohexane, methylcyclohexane, benzene, toluene, xylene, chlorobenzene, ethylene dichloride, ethyl acetate, isopropyl acetate, methyl ethyl ketone, methyl isobutyl ketone, etc. These may be used either alone or combinedly as a mixture of two or more. Among them, ethylene dichloride, normalhexane, cyclohexane, normalheptane and ethyl acetate are preferred since they are stable in quality and readily available.

The radical polymerization catalyst mentioned above is not limited to any particular species but may be, for example, α,α'-azobisisobutyronitrile, 2,2'-azobis(2,4-dimethylvaleronitrile), dimethyl 2,2'-azobisisobutyrate, benzoyl peroxide, lauroyl peroxide, cumene hydroperoxide or tert-butyl hydroperoxide, for instance.

The level of addition of the above-mentioned radical polymerization catalyst may vary according to the catalyst species and/or the temperature used but, generally, is preferably within the range of 0.1 to 10% by weight based on the total amount of αβ-unsaturated carboxylic acid (a) plus compound (b) having at least two ethylenically unsaturated groups. At addition levels below 0.1% by weight, the rate of the polymerization reaction will be too slow, rendering the process uneconomical. At addition levels above 10% by weight, the polymerization reaction will proceed very rapidly, making it difficult to remove the heat of reaction and maintain the reaction temperature at a desired level. A more preferred range is 0.3 to 3% by weight.

In the practice of the present invention, the polymer composition containing carboxyl group may further comprise at least one α,β-unsaturated compound copolymerizable with the above-mentioned α,β-unsaturated carboxylic acid (a) and compound (b) having at least two ethylenically unsaturated groups.

Said α,β-unsaturated compound is not limited to any particular species but includes, among others, acrylate esters such as methyl acrylate, ethyl acrylate, isopropyl acrylate, butyl acrylate, octyl acrylate, 2-ethylhexyl acrylate, decyl acrylate, lauryl acrylate, stearyl acrylate, glycidyl acrylate, etc.; methacrylate ester corresponding to said acrylate esters; glycidyl ethers such as vinyl glycidyl ether, isopropenyl glycidyl ether, allyl glycidyl ether, butenyl glycidyl ether, etc.; acrylamides such as acrylamide, N-methylacrylamide, N-ethylacrylamide, N-tert-butylacrylamide, etc.; methacrylamides corresponding to said acrylamides; and vinyl esters such as vinyl acetate, vinyl propionate, vinyl benzoate, etc. These may be used either singly or in combination as a mixture of two or more.

The α,β-unsaturated compound is preferably used at an addition level of 0.1 to 20 parts by weight per 100 parts by weight of crosslinked polymer (A). At addition levels below 0.1 part by weight, the addition of the α,β-unsaturated compound produces no or little effect while the addition at levels exceeding 20 parts by weight will not produce the effect corresponding to such excessive addition of the α,β-unsaturated compound, hence is economically disadvantageous. A more preferred range is 1 to 10 parts by weight.

Since the polymer composition containing carboxyl group obtained in accordance with the present invention carries carboxyl groups, when dissolved in water and then neutralized with a base such as sodium hydroxide or triethanolamine, gives a neutralized viscous liquid excellent in thickening property and flow characteristics. As a result, it produces a higher thickening effect and forms a plastic fluid having a higher yield value as compared with the prior art crosslinked polymers containing carboxyl group. Generally, the yield value of the dispersion medium, rather than the apparent viscosity thereof, is a predominant factor in the stabilization of emulsions and suspensions. The polymer composition containing carboxyl group of the invention shows a high yield value and therefore has an excellent suspension stabilizing effect. Moreover, as compared with the prior art crosslinked polymers containing carboxyl group, the polymer composition of the invention rarely causes lump formation, has better solubility, gives less viscous aqueous solutions before neutralization and, hence, can readily be dissolved to a higher concentration.

The mechanisms of action by which the polymer composition containing carboxyl group of the invention shows good solubility, high thickening effects and excellent flow characteristics, among others, remain uncertain. It is presumable, however, that the linear polymer such as polyvinylpyrrolidone forms an association product with carboxylic acid moieties in the crosslinked polymer containing carboxyl group to thereby prevent early stage hydration of particles of crosslinked polymer containing carboxyl group, leading to good solubility, hence infrequent lump formation.

It is further presumable that the linear polymer such as polyvinylpyrrolidone renders particles of the crosslinked polymer containing carboxyl group three-dimensional to an appropriate extent by means of hydrogen bonds and/or ionic bonds, for instance, so that a higher thickening effect can be produced and a plastic fluid having a higher yield value can be formed as compared with the case where the crosslinked polymer containing carboxyl group is used alone.

BEST MODES FOR CARRYING OUT THE INVENTION

The following examples illustrate the present invention in further detail but are by no means limitative of the scope of the present invention.

EXAMPLES 1-1 TO 1-4

Acrylic acid-based, crosslinked polymer compositions containing carboxyl group were produced using ethylene dichloride as the inert solvent, azobisisobutyronitrile (hereinafter, AIBN) as the radical polymerization catalyst, pentaerythritol tetraallyl ether as the crosslinking agent and polyvinylpyrrolidone (K-90) as the polymer comprising vinylpyrrolidone as an essential constituent thereof, and varying the addition level of polyvinylpyrrolidone.

A 500-mL four-necked flask was charged in advance with the above-mentioned solvent and then charged with the $\alpha,\beta$-unsaturated carboxylic acid, crosslinking agent and radical polymerization catalyst in the proportions shown below. Polyvinylpyrrolidone (K-90) was added in the proportion shown in Table 1 and polymerization was carried out.

| | |
|---|---|
| Acrylic acid | 40 g |
| Pentaerythritol tetraallyl ether | 0.36 g |
| AIBN | 0.13 g |
| Ethylene dichloride | 366 g |

The reaction was carried out in a nitrogen atmosphere with stirring for 3 hours while maintaining the temperature at 55° C. to 60° C. Then, the reaction mixture was further stirred for 30 minutes under refluxing ethylene dichloride.

Then, after completion of the polymerization reaction, the resulting slurry was heated to about 110° C. to remove the inert solvent.

Thus were obtained about 40 to 60 g of acrylic acid-based, crosslinked polymer compositions containing carboxyl group as a white fine powder. This polymer composition was tested for dissolution time, aqueous solution viscosity, neutralized viscous solution viscosity and yield value in the following manner. The results obtained are shown in Table 1.

Dissolution Time Measurement

Deionized water (298.5 g) was placed in a 500-mL beaker and 1.5 g of the polymer composition was added all at once with stirring at a rate of 500 rpm using a four-blade paddle (blade diameter 50 mm) agitator. Thereafter, the state of dissolution was followed by the eye and the time required for the composition to dissolve to give an aqueous solution with a concentration of 0.5% by weight was determined.

Aqueous Solution Viscosity Measurement

The 0.5 weight percent aqueous solution prepared by the above method or a 1.0 weight percent aqueous solution prepared in the same manner was measured for viscoslty using a type B rotational viscometer under the conditions of 25° C. and 20 rpm.

Neutralized Viscous Solution Viscosity Measurement

The 0.5 weight percent aqueous solution prepared in the above manner was neutralized to pH 7 with an aqueous solution of sodium hydroxide to give a neutralized viscous solution with a concentration of 0.5% by weight.

The viscosity of this neutralized viscous solution was determined on a type B rotational viscometer at 25° C. and 20 rpm.

Yield Value Measurement of Neutralized Viscous Solution

The 0.5% (by weight) neutralized viscous solution prepared in the above manner was measured for viscosity on a type B rotational viscometer under the conditions of 25° C. and 0.5 rpm and under the conditions of 25° C. and 1.0 rpm. The yield value was roughly estimated by the formula:

$$\text{Yield value} = \frac{(\text{apparent viscosity at 0.5 rpm}) - (\text{apparent viscosity at 1.0 rpm})}{100}$$

Comparative Example 1

An acrylic acid-based, crosslinked polymer containing carboxyl group was produced as a white fine powder by performing polymerization under the same conditions as in Example 1-1 except that the addition of polyvinylpyrrolidone (K-90) was omitted. This polymer was evaluated for dissolution time, aqueous solution viscosity, neutralized viscous solution viscosity and yield value in the same manner as in Example 1-1. The results obtained are shown in Table 1.

Comparative Example 2

An acrylic acid-based, crosslinked polymer composition containing carboxyl group was prepared as a white fine powder by performing polymerization under the same conditions as in Example 1-1 except that polyvinyl pyrrolidone (K-90) was used in an amount of 0.002 g.

The thus-obtained crosslinked polymer composition containing carboxyl group was measured for dissolution time, aqueous solution viscosity, neutralized viscous solution viscosity and yield value in the same manner as in Example 1-1. The results obtained are shown in Table 1.

Comparative Example 3

An acrylic acid-based, crosslinked polymer composition containing carboxyl group was prepared as a white fine powder by performing polymerization under the same conditions as in Example 1-1 except that polyvinyl pyrrolidone (K-90) was used in an amount of 28.0 g.

The thus-obtained crosslinked polymer composition containing carboxyl group was measured for dissolution time, aqueous solution viscosity, neutralized viscous solution viscosity and yield value in the same manner as in Example 1-1. The results obtained are shown in Table 1.

TABLE 1

| | | Amount added (g) | Dissolution time (min.) | Viscosity of 0.5 wt. % aqueous solution (cps) | Viscosity of 0.5 wt. % neutralized viscos solution (cps) | Yield value of 0.5 wt. % neutralized viscos solution |
|---|---|---|---|---|---|---|
| Example 1-1 | polyvinylpyrrolidone (K-90) | 0.04 | 50 | 580 | 48,000 | 2,000 |
| Example 1-2 | polyvinylpyrrolidone (K-90) | 2.0 | 30 | 90 | 52,500 | 3,000 |
| Example 1-3 | polyvinylpyrrolidone (K-90) | 8.0 | 20 | 20 | 50,000 | 2,800 |
| Example 1-4 | polyvinylpyrrolidone (K-90) | 20.0 | 10 | 10 | 48,000 | 2,200 |
| Comparative Example 1 | — | — | — | 80 | 680 | 45,000 | 1,100 |
| Comparative Example 2 | polyvinylpyrrolidone (K-90) | 0.002 | 80 | 660 | 45,500 | 1,200 |
| Comparative Example 3 | polyvinylpyrrolidone (K-90) | 28.0 | 10 | 10 | 31,000 | 900 |

Examples 2–1 to 2–3.

Acrylic acid-based, crosslinked polymer compositions containing carboxyl group (each about 40 g) were prepared each as a white fine powder by performing polymerization under the same conditions as in Example 1-2 except that polyvinylpyrrolidone species differing in molecular weight as indicated in Table 2 were used.

The thus-obtained crosslinked polymer compositions containing carboxyl group were measured for dissolution time, aqueous solution viscosity, neutralized viscous solution viscosity and yield value in the same manner as in Example 1-1. The results obtained are shown in Table 2.

| Acrylic acid | 40 g |
|---|---|
| Pentaerythritol tetraallyl ether | 0.4 g |
| AIBN | 0.13 g |
| Ethylene dichloride | 366 g |

After initiation of the polymerization reaction, a mixed solution composed of 2.0 g or 0.4 g of a polymer comprising vinylpyrrolidone as an essential constituent thereof, or polyethylene oxide and 107 g of ethylene dichloride was added continuously over about 3 hours and then the whole mixture

TABLE 2

| | | Molecular Weight | Amount added (g) | Dissolution time (min.) | Viscosity of 0.5 wt. % aqueous solution (cps) | Viscosity of 0.5 wt. % neutralized viscos solution (cps) | Yield value of 0.5 wt. % neutralized viscos solution |
|---|---|---|---|---|---|---|---|
| Example 2-1 | polyvinylpyrrolidone (K-30) | 40,000 | 2.0 | 30 | 380 | 50,000 | 2,200 |
| Example 2-2 | polyvinylpyrrolidone (K-90) | 630,000 | 2.0 | 30 | 90 | 52,500 | 3,000 |
| Example 2-3 | polyvinylpyrrolidone (K-120) | 1,450,000 | 2.0 | 20 | 75 | 54,000 | 3,200 |

Examples 3–1 to 3–7.

Acrylic acid-based, crosslinked polymer compositions containing carboxyl group were prepared using ethylene dichloride as the inert solvent, AIBN as the radical polymerization catalyst, pentaerythritol tetraallyl ether as the crosslinking agent, and varying species of the polymers comprising vinylpyrrolidone as an essential component thereof or polyethylene oxide each specified in Table 3.

A 500-mL four-necked flask was charged in advance with the above-mentioned solvent and then charged with the α,β-unsaturated carboxylic acid, crosslinking agent and radical polymerization catalyst in the proportions shown below, and polymerization was carried out at 55° C. to 60° C.

was maintained under refluxing ethylene dichloride for 30 minutes. Then, the slurry formed after completion of the polymerization reaction was heated to about 110° C. to remove the inert solvent.

Thus was obtained about 40 g of an acrylic acid-based, crosslinked polymer composition containing carboxyl group as a white fine powder.

The crosslinked polymer compositions containing carboxyl group obtained in the above manner were measured for dissolution time, aqueous solution viscosity, neutralized viscous solution viscosity and yield value in the same manner as in Example 1-1. The results are shown in Table 3.

Comparative Example 4

An acrylic acid-based, crosslinked polymer composition containing carboxyl group was prepared as a white fine powder by performing polymerization under the same conditions as in Example 3-1 except that neither a polymer comprising vinylpyrrolldone as an essential constituent thereof nor polyethylene oxide was used.

The crosslinked polymer composition containing carboxyl group was measured for dissolution time, aqueous solution viscosity, neutralized viscous solution viscosity and yield value in the same manner as in Example 1-1. The results are shown in Table 3. In Table 3, 1) denotes a vinylpyrrolidone-hexadecene copolymer, 2) a vinylpyrrolidone-eicosene copolymer and 3) a vinylpyrrolidone-vinyl acetate copolymer.

white fine powder by performing polymerization under the same conditions as in Example 4 except that the addition of the vinylpyrrolidone-hexadecene copolymer was omitted. This polymer composition showed a dissolution time of 60 minutes, its aqueous solution having a concentration of 1.0% by weight showed a viscosity of 250 cps, an neutralized viscous liquid having a concentration of 0.5% by weight showed a viscosity of 31,000 cps and a yield value of 700.

Industrial Applicability

The present invention provides a polymer composition containing carboxyl group which, as compared with the

TABLE 3

|  |  | Amount added (g) | Dissolution time (min.) | Viscosity of 0.5 wt. % aqueous solution (cps) | Viscosity of 0.5 wt. % neutralized viscos solution (cps) | Yield value of 0.5 wt. % neutralized viscos solution |
|---|---|---|---|---|---|---|
| Example 3-1 | polyvinylpyrrolidone (K-90) | 2.0 | 15 | 40 | 67,000 | 3,100 |
| Example 3-2 | polyethyleneoxide (Mw = 45,000) | 2.0 | 50 | 200 | 53,000 | 2,000 |
| Examlple 3-3 | polyethyleneoxide (Mw = 900,000) | 2.0 | 40 | 55 | 60,000 | 2,500 |
| Example 3-4 | polyethyleneoxide (Mw = 6,000,000) | 0.4 | 15 | 15 | 62,000 | 2,700 |
| Example 3-5 | Antaron v-216[1] | 0.4 | 5 | 50 | 52,000 | 1,900 |
| Example 3-6 | Antaron v-220[2] | 0.4 | 5 | 40 | 53,000 | 2,000 |
| Example 3-7 | PVP/VA copolymer[3] | 2.0 | 40 | 120 | 53,000 | 2,000 |
| Comparative Example 4 | — | — | — | 70 | 600 | 47,000 | 1,200 |

Example 4

An acrylic acid-based, crosslinked polymer composition containing carboxyl group was prepared using normalhexane as the inert solvent, AIBN as the radical polymerization catalyst, polyallylsaccharose as the crosslinking agent, and a vinylpyrrolidone-hexadecene copolymer (Antaron V-216; product of GAF) as the polymer comprising vinylpyrrolidone as an essential component thereof.

A 500-mL four-necked flask was charged in advance with 223 g of normalhexane and then with 40 g of acrylic acid, 0.14 g of AIBN and 0.4 g of the vinylpyrrolidone-hexadecene copolymer, and polymerization was carried out at 55° C. to 60° C.

After initiation of the polymerization reaction, a mixed solution composed of 0.45 g of polyallyl saccharope and 10 g of normalhexane was added dropwise over about 2 hours, followed by 1 hour of continued polymerization. Thereafter, the reaction mass was further maintained under refluxing normalhexane for 30 minutes. Then, the slurry formed after completion of the polymerization reaction was heated to about 110° C. to eliminate the inert solvent.

Thus was obtained about 40 g of an acrylic acid-based, crosslinked polymer composition containing carboxyl group as a white fine powder. This polymer composition showed a dissolution time of 10 minutes, its aqueous solution having a concentration of 1.0% by weight showed a viscosity of 50 cps, an neutralized viscous liquid having a concentration of 0.5% by weight as derived therefrom showed a viscosity of 38,500 cps and a yield value of 1,350.

Comparative Example 5

An acrylic acid-based, crosslinked polymer composition containing carboxyl group (about 40 g) was obtained as a prior art crosslinked polymers containing carboxyl group, is better in water solubility and excellent in thickening effect and flow characteristics. The polymer composition containing carboxyl group of the present invention, when dissolved in water and neutralized with an appropriate base, forms a plastic fluid showing a higher viscosity at a lower concentration and having a higher yield value as compared with the known crosslinked polymers containing carboxyl group. Owing to such characteristics, said composition can be used in various fields, for example in industrial fields, as a suspension stabilizer for solids such as gypsum and cement, as a thickener for water-soluble paints and emulsion paints, as a sizing agent for use in textile printing in the fiber industry; in cosmetics and toiletries fields, as an ingredient in creams, lotions, shampoos, tooth pastes, etc.; and in pharmaceutical fields, as an ingredient in ointments and tablets.

We claim:

1. A polymer composition containing carboxyl group which comprises (A) a crosslinked polymer prepared from (a) an α,β-unsaturated carboxylic acid and (b) a compound having at least two ethylenically unsaturated groups, and (B) a polymer comprising N-vinylpyrrolidone as an essential constituent thereof.

2. The polymer composition containing carboxyl group according to claim 1, wherein the polymer comprising vinylpyrrolidone as an essential constituent thereof is at least one member selected from the group consisting of polyvinylpyrrolidone, vinylpyrrolidone-vinyl acetate copolymer, vinylpyrrolidone-hexadecene copolymer and vinylpyrrolidone-eicosene copolymer.

3. The polymer composition containing carboxyl group according to claim 1, wherein the content of said (B) is 0.01 to 60 parts by weight per 100 parts by weight of the crosslinked polymer (A).

4. The polymer composition containing carboxyl group according to claim 1, wherein the α,β-unsaturated carboxylic acid (a) is acrylic acid.

5. The polymer composition containing carboxyl group according to claim 1, wherein the compound (b) having at least two ethylenically unsaturated groups is at least one member selected from the group consisting of pentaerythritol tetraallyl ether, tetraallyloxyethane, triallyl phosphate and polyallylsaccharose.

* * * * *